US007115861B2

(12) United States Patent
Livi

(10) Patent No.: US 7,115,861 B2
(45) Date of Patent: Oct. 3, 2006

(54) SPECTROGRAPH TIME OF FLIGHT SYSTEM FOR LOW ENERGY NEUTRAL PARTICLES

(75) Inventor: Stefano A. Livi, Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 43 days.

(21) Appl. No.: 10/526,408

(22) PCT Filed: Sep. 10, 2003

(86) PCT No.: PCT/US03/28208

§ 371 (c)(1), (2), (4) Date: Mar. 2, 2005

(87) PCT Pub. No.: WO2004/025249

PCT Pub. Date: Mar. 25, 2004

(65) Prior Publication Data

US 2006/0011828 A1 Jan. 19, 2006

Related U.S. Application Data

(60) Provisional application No. 60/409,690, filed on Sep. 10, 2002.

(51) Int. Cl.

| | |
|---|---|
| ***B01D 59/44*** | (2006.01) |
| *H01J 49/00* | (2006.01) |
| *H01J 49/30* | (2006.01) |

(52) U.S. Cl. ...................... 250/290; 250/294; 250/295; 250/296; 250/298; 250/300

(58) Field of Classification Search ................ 250/290, 250/294–300

See application file for complete search history.

(56) References Cited

U.S. PATENT DOCUMENTS

| | | | | |
|---|---|---|---|---|
| 4,221,964 | A | 9/1980 | Schlereth et al. | |
| 4,315,149 | A | 2/1982 | Ledford, Jr. | |
| 5,625,186 | A | 4/1997 | Frankevich et al. | |
| 5,726,448 | A * | 3/1998 | Smith et al. | 250/290 |
| 6,667,487 | B1 * | 12/2003 | Sims et al. | 250/493.1 |
| 6,759,651 | B1 * | 7/2004 | Li | 250/288 |
| 6,794,647 | B1 * | 9/2004 | Farnsworth et al. | 250/293 |
| 2003/0155496 | A1 * | 8/2003 | Kalinitchenko | 250/281 |
| 2003/0201387 | A1 * | 10/2003 | Hartley et al. | 250/281 |
| 2004/0164241 | A1 * | 8/2004 | Farnsworth et al. | 250/293 |

OTHER PUBLICATIONS

“Application of the Rotating Electric Monopole Theory to Marginal Oscillators,” Melvin B. Comisarow, International Journal of Mass Spectrometry and Ion Physics, 26 (1978) pp. 369-378.
“Design and Analysis of a Mass Spectrometer with Superimposed Magnetic and Rotating Electric Fields,” Murai et al., T.IEE Japan, vol. 122-A (2002) No. 3, pp. 250-260.
“Charged Particles in a Rotating Magnetic Field,” Fernandez et al., Physical Review A—Atomic, Molecular, and Optical Physics v. 65 n 5 B (May 2002) p. 561011 (Abstract).
“Mass Spectroscopy Using a Rotating Electric Field,” Clemmons et al., Rev. Sci. Instrum, 69(6), pp. 2285-2291, (Jun. 1998) (Abstract).

* cited by examiner

*Primary Examiner*—Kiet T. Nguyen
*Assistant Examiner*—Johnnie L Smith, II
(74) *Attorney, Agent, or Firm*—Benjamin Y. Roca

(57) ABSTRACT

A mass spectrometer is provided for identifying mass and velocity distributions in a continuous ion beam is configured with a circular dispersive system creating a rotating electromagnetic field, which is capable of deflecting the ion beam from an initial direction, and a circular position-sensitive detector intercepting the deflected ion beam and providing information from which the ion mass-per-charge ratio is determined

19 Claims, 4 Drawing Sheets

SPECTROGRAPH TIME OF FLIGHT SYSTEM FOR LOW ENERGY NEUTRAL PARTICLES

CROSS-REFERENCE TO RELATED APPLICATIONS

This application claims priority to U.S. Provisional Application No. 60/409,690, filed Sep. 10, 2002, the contents of which are incorporated herein by reference.

BACKGROUND OF THE INVENTION

1. Field of the Invention

The present invention generally relates to time-of-flight (TOF) mass spectrometers, and in particular to a TOF mass spectrometer utilizing rotating electromagnetic field for identifying the chemical composition of low-pressure gases, the relative abundance of different species, and the particle flow direction and velocity.

2. Description of the Related Art

Analysis of the chemical composition of gases plays a central role in our attempt to understand the origin and the evolution of our solar system. In situ analysis of the gas must be considered complementary to remote sensing: while the first type of measurement identifies and quantifies all chemical compounds at a point in space, the second gives a spatial overview of those elements and compounds that generate a unique optical signature, like an emission or absorption line. The enrichment or depletion of a specific element is important information, when trying to understand the processes that control planetary evolution. Investigations of the Martian atmosphere and the coma of comets both rely on detailed chemical composition information. The composition of the Martian atmosphere was characterized during the descent phase of both Viking landers.

Many questions have been left unanswered, in particular the variation of the chemical composition associated with the dust content of the atmosphere, as well as the coupling between atmospheric composition and climate variations. The chemical composition and relative abundance of elements in the atmosphere of comets and small bodies is a rapidly varying function of the solar illumination, latitudinal and longitudinal position, and height from the body's surface. To characterize the changes and relate them to features on the surface, a mass spectrometer must show at the same time high resolving capability and fast response. State of the art mass-spectrometers may not be entirely suitable for measurements of gases where the composition varies rapidly, or where the composition is not known a-priori, and the full mass spectrum has to be analyzed in a relatively short time. Study of the atmospheres and exospheres of planets and small bodies of the solar system is a central point in the NASA programs of the next decade. Chemical and isotopic characterization of these tenuous gases is extremely important when trying to understand origin and evolution of the solar system itself.

Many different techniques have been proposed and implemented during the past century to quantitatively determine the relative and absolute abundance of chemical components. In the realm of low-pressure gases, where a single particle approach is appropriate, atoms and molecules in either neutral or ionized state are analyzed. Neutral particles are usually ionized before the analysis, typically using electron bombardment.

Among numerous types of TOF spectrometers, it is known to use a TOF mass spectrometer utilizing a rotating RF field. In general, this type of mass spectrometer is known for its increased ability to reliably acquire and analyze mass spectra with high sensitivity, high accuracy and high duty cycle, since ions continuously traverse a dispersion system and are continuously analyzed.

U.S. Pat. No. 6,521,887 discloses a TOF mass spectrometer provided with an electrostatic deflection apparatus, which includes multiple dispersing electrodes arranged in consecutive pairs that are spaced angularly relative to one another at approximately right angle. Ions continuously entering a drift tube are first swept by the electrostatic deflection apparatus so that the ion trajectory is a function of the voltage impressed on the dispersing electrodes during the time the ion passes there through. Placing a detector at the predetermined lateral distance from the symmetry axis of the deflection apparatus allows only ions of interest to impact thereupon. This information, when combined with information on the voltages applied and the hit time of the ion detection provides a method for determining the time-of-flight of the detected ion along the drift region having known length. Having determined the time and knowing the distance traveled by the detected ion, one can determine its speed and further its mass-per-charge ratio, assuming that the ion beam has a well known energy-per-charge ratio.

Universally, all types of mass spectrometer are configured to attain, among others, the following objectives (1) high ionization rate; (2) high mass resolution; and (3) compactness.

Additionally, in the context of the TOF mass spectrometer with the rotating electromagnetic field, it is highly important to minimize fringing fields, which detrimentally affect the desired trajectory of deflected ions. A combination of consecutively positioned pairs of dispersing electrodes, as disclosed in U.S. Pat. No. 6,521,887, contributes to rather a space-inefficient structure as well as the presence of substantial fringing fields.

A need therefore exists for a TOF mass spectrometer having a very high mass resolving power (capable of separating different isotopes at the 1% level), an extremely high sensitivity (to be able to measure very diluted gases), and requiring very limited resources indispensable for space applications.

SUMMARY OF THE INVENTION

A TOF mass spectrometer in accordance with the present invention is configured to have a rotating field to provide extremely high mass resolution observations. In the inventive spectrometer, the mass of the particle is determined by the time of flight through a given region and can be calculated as a difference between the stop time corresponding to an impact of ions upon a detector and the start time imprinted on the trajectory of the particle by electromagnetic field that bends the trajectory in a given plane.

Every individual ion is analyzed by the inventive apparatus, which increases the total sensitivity of the spectrometer. Moreover, the performance of the spectrometer of the present invention depends on fast electronics rather then on mechanical tolerances, making these types of sensors mechanically simple, robust, and easy to operate.

In accordance with one aspect of the present invention, the dispersive system has at least a cylindrical configuration creating the desired electric field. This particular configuration has the property of minimizing the fringing fields, while at the same time attaining the desired deflection of the ions. Still a further advantage of the cylindrical configuration of the dispersive system is its compactness.

In a further aspect of the present invention, the ion beam conically shaped by the dispersive system is impinged upon a position-sensitive detector having a circular cross-section. Accordingly, a detector impacted by the beam is configured as a ring. Such a configuration provides for the detection of a large spread-out signal rather than a concentrated point signal. A critical advantage stemming from the circular detector includes the greatly increased throughput, since along with the particles traversing the dispersive system, when the desired electric field has a predetermined phase, other particles of interest are able to reach the detector.

Another aspect of the inventive system includes a reflectron positioned along the predetermined deflected ion path and operating to redirect the impacting particles back towards the dispersing system. Not only is the reflectron capable of intercepting the beam extending at an angle to the axis of symmetry, but it also redirects this beam so that the dispersive system is not "bombarded" by the reflected beam. The use of the reflectron radically decreases the axial length of the inventive spectrometer while increasing the ratio between the distance traveled by the ionized beam along a drift region and the actual distance of the dispersive system. The properly increased ratio, in turn, leads to a higher mass resolution. Furthermore, incorporating the reflectron allows the circular detector to be positioned concentrically with the dispersive system, which leads to the reduced size of the inventive spectrometer.

Accordingly, it is an object of the invention to provide a high mass resolution, time-of-flight (TOF) spectrometer for low energy neutral particles.

Still another object of the invention is to provide a high mass resolution TOF spectrometer characterized by isotopic resolving capability and temporal resolution within very limited resources.

A further object of the invention is to provide a high mass resolution TOF spectrometer having a compact structure.

BRIEF DESCRIPTION OF THE DRAWINGS

The above and other features, objects and advantages will become more readily apparent from the following specific description accompanied by a set of drawings, in which.

DETAILED DESCRIPTION OF THE PREFERRED EMBODIMENTS

Figure 1:
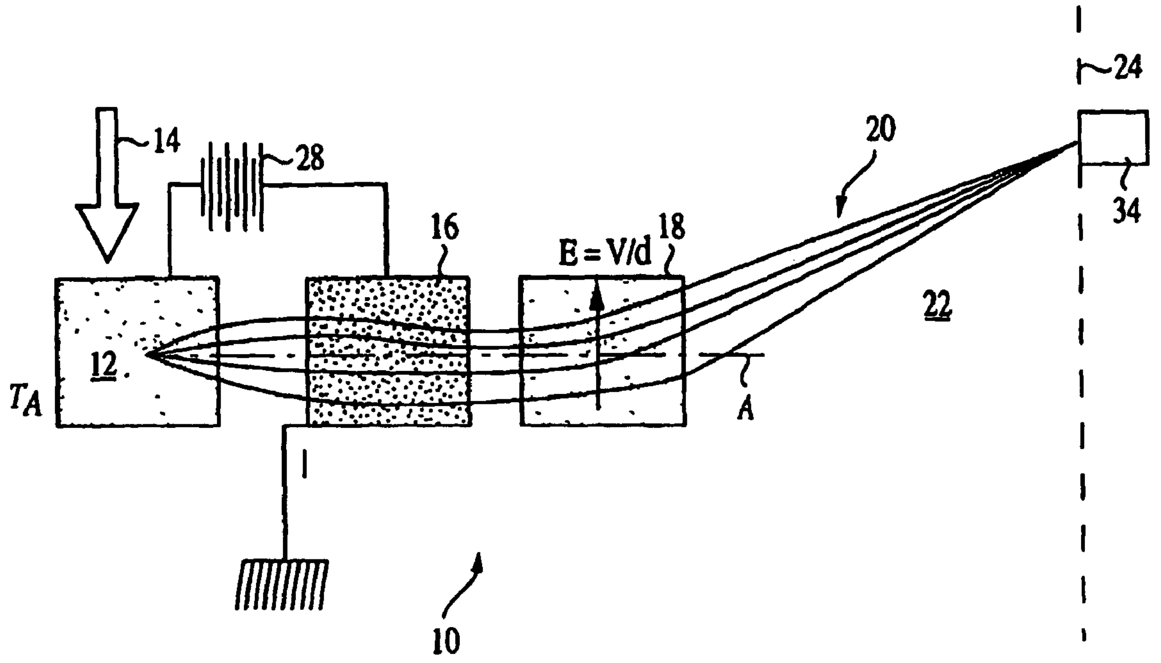
FIG. 1 is a block diagram of TOF mass spectrometer configured in accordance with the inventive concept.

As shown in FIG. 1, a TOF mass spectrometer 10 provides for the mass of the particles to be determined by their time of flight through a given region. Structurally, the TOF mass spectrometer 10 includes an ionization source 12 operative to typically produce electrons ionizing, via electron impact, the neutral molecules of continuous gas flow 14. Upon being conically shaped by a focusing system 16, ions of interest are directed through an RF field 18 which will separate different mass/charge ions by creating a rotating electromagnetic field which directs the ions along a predetermined deflected path 20 as a result of the voltage impressed thereupon. As a consequence, continuous ion beams swept by the dispersing system 18 enters an evacuated, field free drift region 22 at a predetermined angle to a longitudinal axis A—A of the spectrometer 10, which defines the deflected path 22. Having traveled through the drift region 22, the beam impinges upon a detector 24 located along the path 20 at a distance from the dispersing system 16. Detecting the impinged ions allows for measuring their time of flight through the drift region 22, which is indispensable to the further calculation of the ion mass/charge ratio. The spectrometer 10, thus, is characterized by high duty cycle and rapid acquisition of mass spectra.

Figure 2:
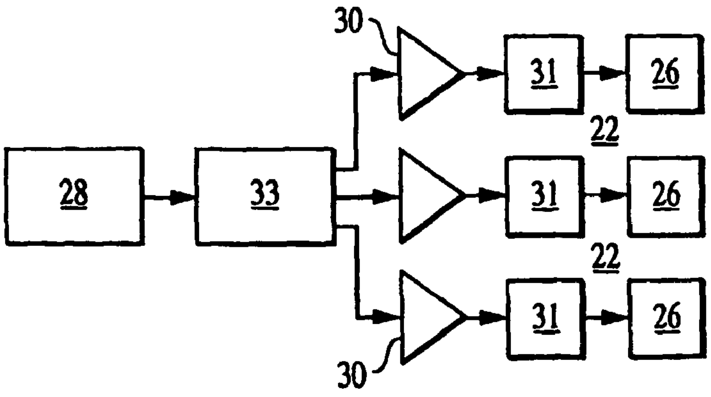
FIG. 2 is a diagrammatic view of a dispersing system including a plurality of segmented dispersing electrodes.
Figure 3A:
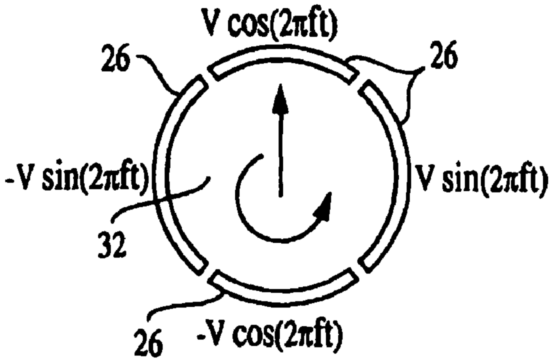
FIGS. 3A and 3B are diagrams explaining the principle of operation of the inventive TOF mass spectrometer of FIG. 1.
Figure 3B:
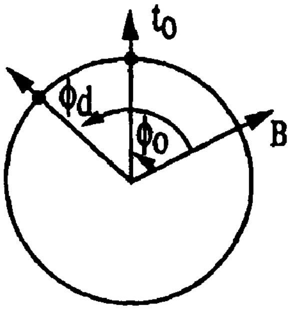

Turning to FIGS. 2, 3A and 3B, the dispersing system 16 includes at least a plurality of spaced dispersing electrodes 26 coextending with one another and each having a curved inner surface, which lies along arc of a circle. A main power supply source 28 (FIG. 2) operatively coupled to the dispersing system 16 includes a field programmable gate array (fpga) and phase shifter 33 operative to produce phase shifts between the desirable frequencies. Multiple amplifies 30 amplify a voltage signal up to about 50 volts, which are further increased by transformers 31 each directly coupled to a respective pair of electrodes 26. It is highly desirable that the voltage applied to the electrodes 26 be at least within a −300/+300V range, the higher the better. In addition to an amplifying function, the transformers act as an impedance matcher between the amplifiers and the electrodes 26. Reduction of power consumption can be realized by increasing the number of amplifiers and/or transformers by a factor of 2, which, in turn, leads to an about 50% reduction of the maximum voltage on each of the electrode.

Turning to FIG. 3A, the circular configuration of the dispersing electrodes 26 creates a well-behaved electric field inside a dispersing region 32 and is characterized by greatly minimized fringing fields, which are known to detrimentally affect the desired trajectory of the ions entering the drift region 22. Furthermore, geometrically, the cylindrical configuration is compact. Cumulatively, the compactness and the reduced fringing fields produce the enhanced performance of the TOF mass spectrometer 10. At the very least, the spectrometer has four dispersing electrodes forming a quadrupole configuration. It was found that a six-electrode configuration is optimal; a greater number of dispersing electrodes requires more complex electronics and increased power consumption while not effectively enhancing the overall performance of the spectrometer 10.

As mentioned hereinabove, the dispersing electrodes are responsible for creating a rotating electric field that is capable of separating different mass/charge ions. The ion trajectory within the dispersing region 32 (FIG. 3A) follows a very smooth curve, which is contained in the plane defined by the incoming velocity of the ion beam and the direction of the electric field. Multiple electrodes 26 of the dispersing system 16 create an electric field constant in magnitude, but with direction rotating uniformly in space in a plane perpendicular to the initial ion velocity along the axis A—A (FIG. 1), at a frequency "f". The electrodes 26 are spaced at a distance 2$d$ from each other. A potential applied to the electrode n (n=1 . . . 4) is equal to $$\Psi(t)=V\sin(2\pi ft+n\pi/2)$$

The resulting electric field is constant in magnitude and equal to V/d. As the imposed electric field direction is varied in time, the trajectory within the dispersing electrodes will still be bounded to a plane. Slower particles will experience an "effective field" that is the average of the electric field during the time taken to traverse the electrodes: the resulting change in perpendicular velocity will be smaller (average over time of the sinusoidal waveform), but the mass resolution capability will be retained.

The effect that a rotating electromagnetic field generates mass dispersion can be readily explained in the case of a simple point detector 34, diagrammatically illustrated in FIG. 12 and placed at the appropriate off-axis distance. The trajectory of an ion is such that the latter can hit the detector 34 only if the electric field points to the detector while the ion traverses the dispersing region 32. At all other times, the ion will simply miss the detector. The time difference between the instant when the particle arrives at the detector $t_d$ and the time $t_0$ when the electric field was pointing in the appropriate direction is equal to the travel time $t_2-t_1=t$ through the field free drift region 22. When the ions have a substantially uniform energy/charge (the acceleration voltage) ratio, the time-of-flight is directly proportional to the square root of the mass per charge and can be measured as $$t=D/v=D[(m/q)/(2E/q)]^{1/2}$$

where "v" is the velocity of the ion and D is the length of the path traveled by the ion in the drift region (FIG. 2).

The angular difference between the phase of the electric field and the position on the ring uniquely determines the mass/charge of every ion relative to an arbitrary reference as indicated by arrow B in FIG. 3B. After the flight through the field-free region 22, the ion hits the detector at the time $t=t_d$ and at a position $t_o$ established by the direction $\phi_o$ of the electric field at the time $t=t_o$ when the particle traversed the dispersing region 32. But at the time of the hit $t_d$, the field is pointing in the direction $$\phi_d=\phi_o+2\pi f(t_d-t_o)$$

where f is the frequency of the voltage applied to the electrodes (see FIG. 3B). The mass/charge of the incident ion is then given by:

$$m/q=2E/q[(\phi_d-\phi_o)/2\pi f]^2/D^2$$

From the direct measurement of quantities of $\phi_o$, (the angular position of the hit point on the detector) and $\phi_d$ (phase angle of the electric field at the time $t_d$ the ion hit the detector), the mass/charge of the ion can be determined.

Figure 4:
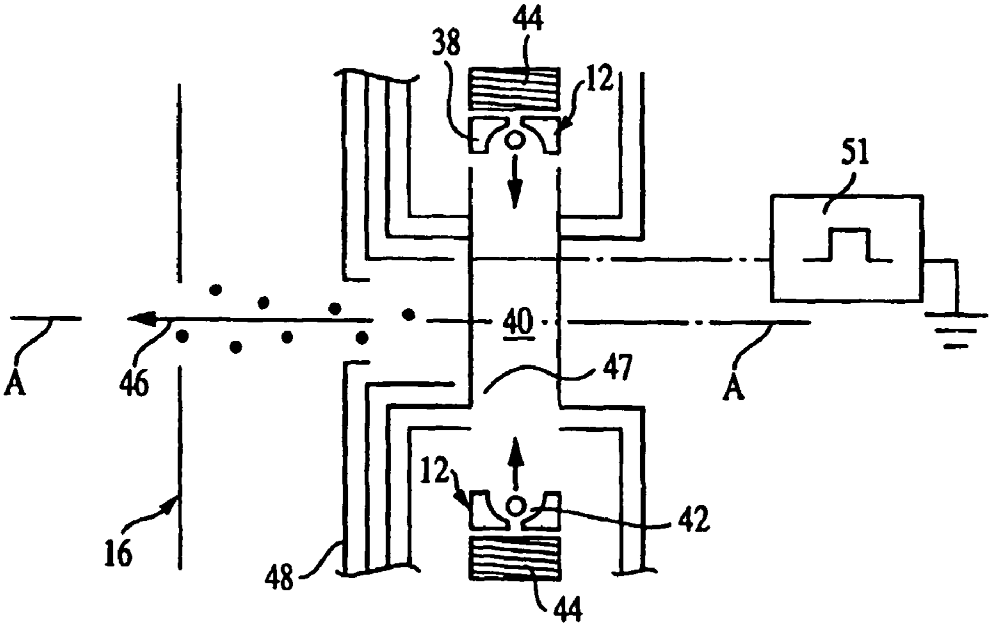
FIG. 4 is a diagrammatic view of the ionizing region of the TOF mass spectrometer of FIG. 1.

The ionization source 12, as shown in FIG. 4, is based on the electron bombardment sources and can be selected from one a hot cathode electron impact, MEMS (micro-machined silicon) electron impact, and a surface impact ionization configuration. As illustrated, the source 12 includes a cathode 38 activated to emit electrons extending towards an ionization region 40 and prevented from fully traversing the latter by a repeller 42 carrying a negative charge. A magnetic yoke 44 operating with the established principles directs the electrons along a direction indicated by an arrow 46 coinciding with the longitudinal axis A—A of the spectrometer 10.

Inflow 14 (FIG. 1) of neutral gas enters the ionization region 40 perpendicular to the drawing plane and is ionized as a result of electron bombardment. Extraction of the ion beam from the ionization region 40 is realized by the potential applied to grid 47. The subsequent focusing optics 48 focuses and accelerates the ion beam to its final energy. The field of view may be determined by a set of electrodes or collimator (not shown) upstream of the ionization region. Suitable potentials applied to these electrodes prevent the entry of low energy ions into spectrometer 10, while ions of higher energy cannot reach the dispersing system 16. This source may combine high sensitivity of about $10^{-}$A/Torr with good linearity over a very wide gas pressure range (from several $10^{-5}$ Torr to below $10^{-14}$ Torr), small energy dispersion and low background. Emission current of the ion source 12 at 1 μA, can be increased (up to a factor of 10) or decreased, to enhance or reduce the efficiency of the source.

Furthermore, by using a simple electronic switch, the voltage on the grid 47 can be pulsed by a pulse generator 51 in phase with the frequency of the voltage, for example an RF frequency. By allowing ions to enter the dispersing region only every other cycle of the wave, the non-overlapping range is increased by a factor of four, as the mass depends on the square of the time-of-flight (in the test with the prototype, the range would be extended from mass range 0–23 to 0–92). The number of spectra sampled per unit time would only be reduced by a factor of two. The acceleration voltage and the frequency of the sinusoidal wave of the dispersion voltage can be cycled between different values, so that the overlapping mass peaks change their relative position. Separate spectra will be accumulated for different setting of the parameters. Subsequent analysis would then properly identify the different elements.

Advantageously, instead of the point detector 34, the TOF mass spectrometer 10 can use a ring detector 36 (FIGS. 5 and 6) acting so that its every point operates as a separate point detector. This possibility enables the spectrometer 10 of the present invention to act as a correlated set of TOF spectrographs, recapturing the duty cycle losses associated with "point" detection.

The selection of the position-sensitive detector 36 is based on two characteristics: good timing and angular resolution. Two-dimensional read-out can be realized in several different configurations including, but not limited to, the following configurations described hereinbelow.

Discrete anode including numerous pieces of metal configured in a ring configuration and each including a respective amplifier. The discrete configuration is characterized by, for example, a high mass resolution, wide dynamic range ($10^7$ particles/sec) and sharp contrast in mass abundance. Unfortunately, this configuration requires complex electronics and instrument volume;

Resistive anode or Wedge-Strip and-Zig-zag detector: annular configuration is provided with a wedge shaped or zig-zag recess along the periphery of the annular body. Structurally, two amplifiers, each coupled to a respective area adjacent to the recess, output signals as an ion flies hit the anode between these amplifies. Depending on the proximity of the ion tone of the edges, one of the signals would be grater than the other. Thus, determination of the angular position of the ion impinged upon the detector is achieved by comparing analogue signals at the ends of the properly shaped resistive anode. One of the advantages of this configuration is its structural simplicity. This, however, is counterbalanced by limitations in the dynamic range ($10^5$ particles/sec), as well as limited mass resolution and limited mass contrast capability. The zig-zag configuration operating on the same principle as the wedge-shaped one, but requires three amplifiers.

Time-delay anode configuration is based on the time difference between the time arrival of the pulses produced by an ion on the ends of a continuous anode. The mechanism of this configuration is based on the fact that when a particle (ion) hits the detector, a signal produced by the latter has to travel there along towards the terminal point. Obviously, depending on a particular location, the signal may travel for a longer or shorter time. The difference in arrival time is used to measure the hit position. One of the advantages of this detector is its good timing characteristics and count rates (~1 MHz).

Still another configuration of the detector includes a coded anode (Codacon) arrangement. Events are detected in separate pixels, but instead of using an individual amplifier for each anode, channels are read and directly encoded. While this arrangement exhibits excellent timing characteristics, the system is not able to handle large spot sizes, i.e. multiple pixel hits.

Figure 5:
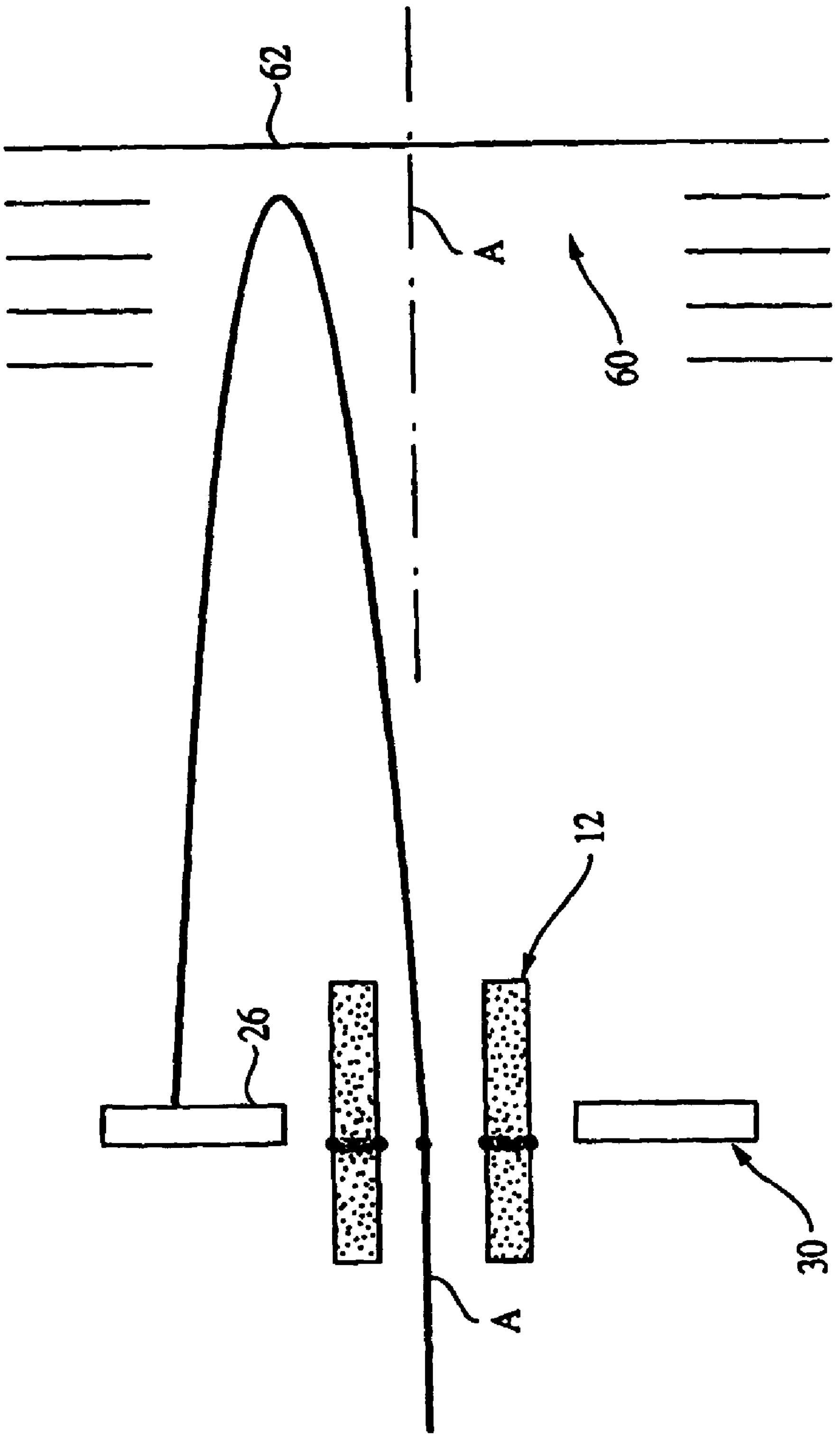
FIG. 5 is a diagrammatic view of the inventive TOF mass spectrometer provided with a reflectron.
Figure 6:
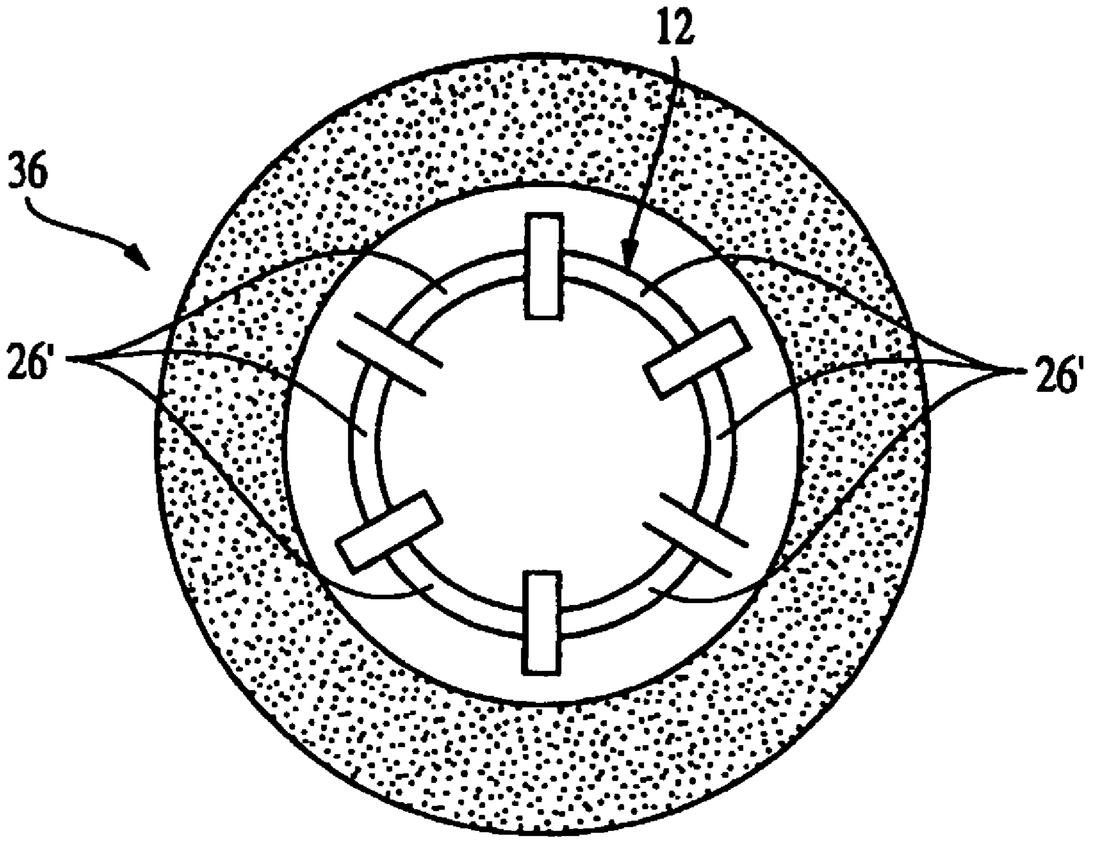
FIG. 6 is a side view of the system shown in FIG. 5.

Referring to FIGS. 5 and 6, the capabilities of the TOF mass spectrometer 10 are advantageously enhanced by incorporating a reflectron 60. The main purpose of the reflectron is to compensate for the uncertainties introduced by energy struggling of the incoming ion beam. This element will enable the relaxation of the rather stringent requirement on energy uniformity imposed by a straight path configuration, as well known in conventional mass spectroscopy TOF. Structurally, the ionized particles leaving the dispersing electrodes 26 of the dispersive system 12 reach the reflectron 60 at a location 62, which is spaced laterally from the axis A—A, in the annular form. This geometric shape is particularly suitable for reflecting the particles back towards the position-sensitive detector 36 surrounding the dispersive system 12 and, thus, reducing the total dimension of the inventive spectrometer.

The mass resolution of the spectrometer 10 is directly related to the energy dispersion of the beam. In a reflectron type configuration, small differences in velocity of the particles of interest are to large extent compensated in variations in their path lengths. For a properly designed reflectron, energy variation as great as about 10% can be compensated to produce time-of-flight variations as small as about 0.5%. In addition, the reduced size of the spectrometer 10 and the capability for removal of contaminating ultraviolet light makes the spectrometer 10 provided wit the reflectron particularly advantageous a missions directed at studying planetary atmospheres and exospheres, cometary missions, and fast flybys.

The above disclosed TOF mass spectrometer 10 is effective in exhibiting high sensitivity (density as low as 100 particles/cm), good mass resolution (adjacent masses separated at the 0.1% level), and good time resolution. Named after an ancient Greek word "Strofio", which means to rotate, the TOF-mass spectrometer of the present invention is well suited for examining the Martian atmosphere at high time resolution during the aerobraking phase of the various missions as well as a key component of a descend vehicle. Future outer planet missions that envision chemical analysis of the atmosphere and therefore would benefit from a Strofio-class instrument are, for example, the Pluto-Kuiper Express mission, the Europa Orbiter, Titan Explorer, Europa Lander, and a Neptune orbiter, all in the NASA roadmap.

Although illustrative embodiments of the present invention have been described herein with reference to the accompanying drawings, it is to be understood that the invention is not limited to those precise embodiments. Therefore, those skilled in the art will envision other modifications within the scope and spirit of the claims appended hereto.

What is claimed is:

1. A mass spectrometer for identifying mass and velocity distributions in a continuous ion beam comprising:

a guide assembly operative to direct the continuous ion beam along a first axis;

a plurality of curved electrodes extending along an arc of a circle and traversed by the continuous ion beam to create a rotating electric field impressed upon and selectively deflecting the continuous ion beam along a second axis extending transversely to the first axis; and a position-sensitive detector operative to detect a position and time of arrival of individual ions in the continuous ion beam, whereby the detected position of each individual ion in the continuous ion beam provides information from which the ion mass-per-charge ratio is determined.

2. The mass spectrometer of claim 1, wherein the plurality of curved electrodes coextend with one another and form a configuration selected from the group consisting of a quadrupole, hexapole and octapole configuration, the plurality of curved electrodes each having a respective inner outwardly concave surface.

3. The mass spectrometer of claim 2, further comprising a power source coupled to the dispersive system and generating a predetermined pattern of electromagnetic field applied to the curved electrodes, a plurality of amplifiers each being coupled to the power source and to a respective pair of diametrically spaced curved electrodes.

4. The mass spectrometer of claim 3, wherein each pair of diametrically spaced curved electrodes define a respective plane extending substantially perpendicular to the rest of planes.

5. The mass spectrometer of claim 1, wherein the position-sensitive detector has an circular cross-section and is selected from the group consisting of a discrete anode, resistive anode, time-delay anode and a coded anode.

6. The mass spectrometer of claim 1, wherein the position-senisitive detector is spaced from the curved electrodes at a distance, which is greater than a length of the dispersal system, whereas a time during which the continuous ion beam traverses a dispersing region defined between the curved electrodes is shorter than a time during which the continuous ion beam traverses the distance between the dispersal system and the position-sensitive detector.

7. The mass spectrometer of claim 6, wherein the position-sensitive detector is a two-dimensional detector.

8. The mass spectrometer of claim 1, further comprising an ionization source located upstream from the guide assembly and selected from the group consisting of hot cathode electron impact, MEMS (micro-machined silicon) electron impact, and surface impact ionization.

9. The mass spectrometer of claim 1, further comprising a reflectron spaced axially between the plurality of curved electrodes and the position-sensitive detector and operative to reverse an axial direction of the continuous ion beam towards the position-sensitive detector.

10. The mass spectrometer of claim 9, wherein the position-sensitive detector is concentric with and surrounds the plurality of curved electrodes.

11. A method for determining an ion mass-per-charge ratio comprises the steps of: (a) directing a ion beam along an axis extending in an initial direction; (b) providing a plurality of curved electrodes extending along an arc of a circle to define a dispersing region therebetween and creating a rotating electric field impressed upon selectively applying a dispersing voltage at a desired frequency to the plurality of curved electrodes; (c) electromagnetically deflecting the ion beam from the axis along a second axis transverse to the first axis while dispersing the ion beam; and (d) detecting with a circular position-sensitive detector intercepting the ion beam characteristics of individual ions of the ion beam.

12. A mass spectrometer for identifying mass and velocity distributions in a continuous ion beam comprising:

a guide assembly operative to direct the continuous ion beam along a first axis;

a plurality of curved electrodes extending along an arc of a circle and traversed by the continuous ion beam to create a rotating electric field impressed upon and selectively deflecting the continuous ion beam along a second axis extending transversely to the first axis;

a circular position-sensitive detector operative to detect a position and time of arrival of individual ions in the continuous ion beam, whereby the detected position of each individual ion in the continuous ion beam provides information from which the ion mass-per-charge ratio is determined; and, a reflectron spaced axially between the plurality of curved electrodes and the position-sensitive detector and operative to reverse an axial direction of the continuous ion beam towards the circular position-sensitive detector configured to surround the plurality of curved electrodes.

13. The method of claim 11, wherein the step (a) includes directing a neutral gas flow transversely to the first axis, ionizing particles contained in the neutral gas flow by an ionization source located upstream from the plurality of curved electrodes, collimating the ionized particles forming the beam while applying an acceleration voltage to a grid positioned between the ionization source and the plurality of curved electrodes.

14. The method of claim 13, further comprising the step of tuning the acceleration voltage and the desired frequency of the dispersion voltage.

15. The method of claim 13, further comprising the step of pulsing the acceleration voltage applied to the grid in phase with the dispersing voltage, thereby allowing the ionized particles to selectively enter the dispersing region.

16. The method of claim 11, further comprising the step of reflecting the ion beam prior to detecting the characteristics of the ions by the position-sensitive detector along a reverse path extending in a direction opposite to the initial direction and spaced laterally from the first axis to avoid impinging upon the plurality of dispersing electrodes.

17. The method of claim 16, wherein the position sensitive detector is provided along the reverse path and surrounds the plurality of curved electrodes.

18. The method of claim 11, wherein the position-sensitive detector determines a position and time of arrival of the individual ions in the ion beam to provide information from which the ion mass-per-charge ration is determined.

19. A mass spectrometer for identifying mass and velocity distributions in a continuous ion beam comprising:

a guide assembly operative to direct the continuous ion beam along a first axis;

a dispersive system traversed by the continuous ion beam and operative to create a rotating electric field impressed upon and selectively deflecting the continuous ion beam along a second axis extending transversely to the first axis; and, a circular position-sensitive detector operative to detect a position and time of arrival of individual ions in the continuous ion beam, whereby the detected position of each individual ion in the continuous ion beam provides information from which the ion mass-per-charge ratio is determined.

* * * * *